United States Patent
Hayner

[11] Patent Number: 6,054,825
[45] Date of Patent: Apr. 25, 2000

[54] METHOD AND APPARATUS FOR HIGH VOLTAGE GENERATION

[75] Inventor: David Hayner, Austin, Tex.

[73] Assignee: Motorola, Inc., Schaumburg, Ill.

[21] Appl. No.: 09/010,044

[22] Filed: Jan. 20, 1998

[51] Int. Cl.[7] ...................................................... H02P 9/00
[52] U.S. Cl. ........................ 318/459; 388/928.1; 318/500
[58] Field of Search .................... 318/138, 254, 318/439, 459, 500, 700, 720, 722, 724; 388/928.1; 363/123, 131, 132, 15, 16, 95, 97, 98

[56] References Cited

U.S. PATENT DOCUMENTS

| | | | |
|---|---|---|---|
| 5,377,094 | 12/1994 | Williams et al. | 318/138 X |
| 5,600,217 | 2/1997 | Bartlett | 318/434 |
| 5,633,568 | 5/1997 | Dunfield | 318/254 |

OTHER PUBLICATIONS

Motorola Inc., 1992, Technical Data, "MC68HC705H2 HCMOS Microcontroller Unit", pp. 1–1 –1–10.

SGS–Thomson Microelectronics, Jun. 1993, "Sensorless Spindle Motor Controller L6238", pp. 1/35 –3/35 and 25/35–26–35.

Philips Semiconductors, Integrated Circuits Data Sheet, May 1996, "TDA5148B VCM and Spindle Driver Combo", pp. 1–25.

*Primary Examiner*—Bentsu Ro
*Attorney, Agent, or Firm*—Paul J. Polansky; Daniel D. Hill

[57] ABSTRACT

A voltage generation circuit (60, 62) is adapted to sense voltages on multiple windings (82, 84, 86) of a multi-phase brushless DC motor (22) during successive intervals of a rotation of the motor (22) in which the respective windings (82, 84, 86) are not being driven. The voltage generation circuit (60, 62) provides a different output voltage from the voltage used to drive the motor (22). In one embodiment, the voltage generation circuit (60, 62) includes a voltage boosting circuit (62) to increase the output voltage above the drive voltage. This voltage generation circuit (60, 62) may be advantageously combined with an electrically programmable read only memory (EPROM) (56) on a single integrated circuit chip. The voltage generation circuit (60, 62) generates the EPROM programming voltage without the need for a costly on-chip charge pump or off-chip DC-DC converter.

9 Claims, 2 Drawing Sheets

METHOD AND APPARATUS FOR HIGH VOLTAGE GENERATION

FIELD OF THE INVENTION

This invention relates generally to circuits, and more particularly to generating voltages for use in integrated circuits.

BACKGROUND OF THE INVENTION

Many integrated circuit applications require voltages that are higher than the normal power supply voltages. The higher voltages may be used for several purposes, such as for example, programming or erasing cells of an embedded flash memory in an integrated circuit microcontroller. The higher voltage may be generated on the integrated circuit by using a charge pump to boost the normal power supply voltage provided to the integrated circuit. Also, some integrated circuits require that a negative voltage be generated in addition to the normal power supply voltage. A charge pump is typically used to generate the negative voltage. However, implementing a charge pump on the integrated circuit to provide the higher voltage, or the negative voltage, increases the size, complexity, and therefore the cost of the integrated circuit.

Another way to provide the higher voltage is to add a second power supply to the system having the integrated circuit, and simply provide the higher voltage to the integrated circuit via a dedicated pin. However, by requiring a user of the integrated circuit to provide the higher voltage, the number of applications in which the integrated circuit may be used is restricted to system where the second power supply is available.

DETAILED DESCRIPTION OF A PREFERRED EMBODIMENT

Generally, the present invention provides an apparatus and method for using a back EMF (electromotive force) voltage generated by a multi-phase DC motor to generate other voltages which may be used in the system. For example, higher voltages may be generated and can then be used to provide program/erase currents in a non-volatile memory system or to provide voltages for powering circuits which drive the inductive heads of a hard disk drive system. Using the back EMF voltage generated from a driven multi-phase DC motor to provide the higher voltage eliminates the need for charge pumps which are typically used to provide the higher voltages.

Figure 1:
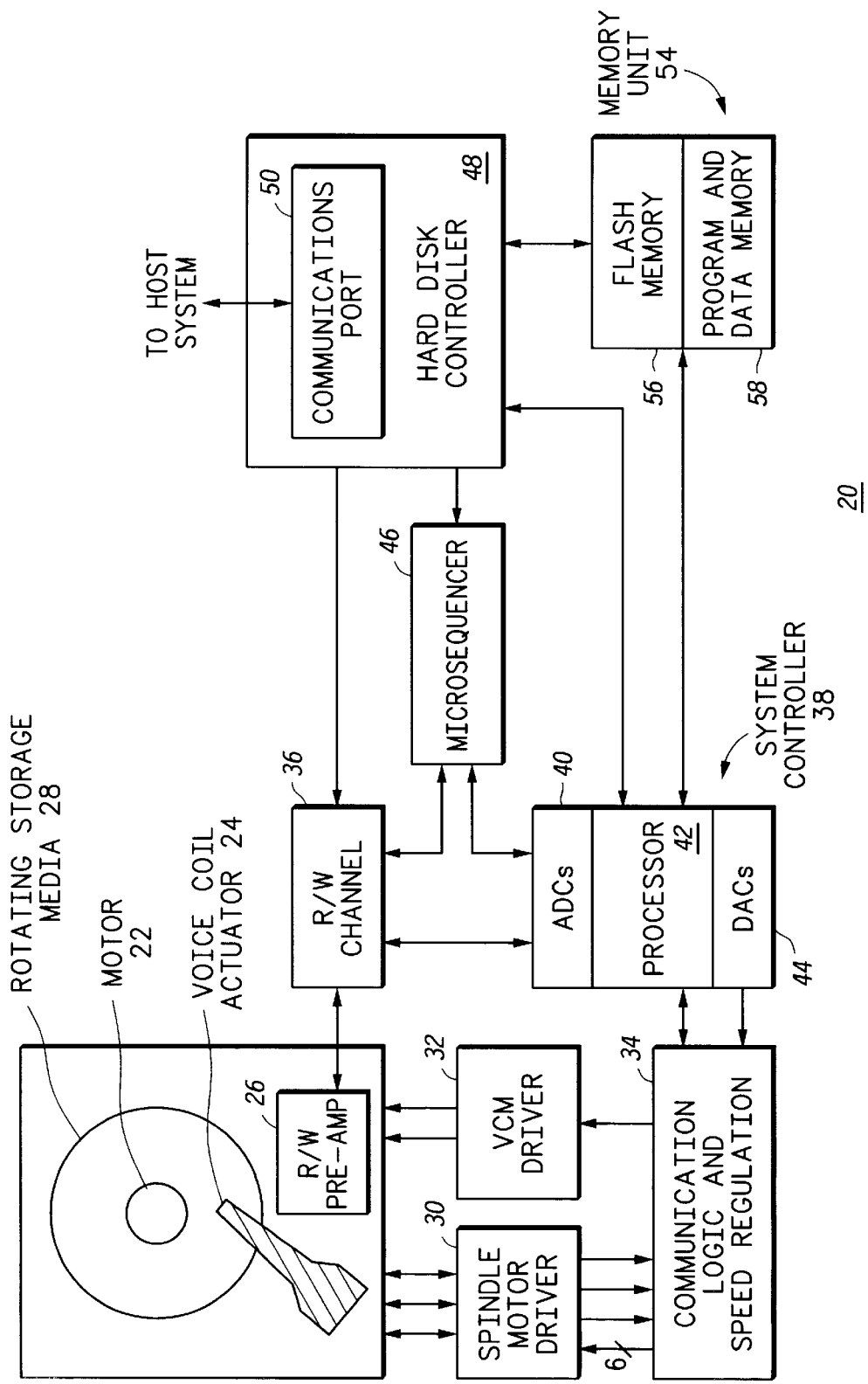
FIG. 1 illustrates, in block diagram form, a hard disk drive system in accordance with the present invention.

FIG. 1 illustrates in block diagram form a hard disk drive system 20 in accordance with the present invention. Hard disk drive system 20 is an electromechanical system which includes a motor 22, a voice coil actuator 24, a read/write (R/W) pre-amp 26, and a rotating storage media 28. Motor 22 is a 3-phase, brushless, direct current (DC) motor. Hard disk drive system 20 also has various circuitry for controlling motor 22 and storing data on or reading data from rotating storage media 28, including a spindle motor driver 30, a voice coil motor (VCM) driver 32, commutation logic and speed regulation 34, a read/write channel 36, a microsequencer 46, a system controller 38, a hard disk controller 48, and a memory unit 54.

Motor 22 is used to rotate rotating storage media 28, whereas voice coil actuator 24 is used to position the read/write head over storage media 28. Motor 22 is controlled by spindle motor driver 30. Voice coil actuator 24 is used to move a read/write head mechanically coupled to the end of voice coil actuator 24 across storage media 28 using VCM driver 32. Spindle motor driver 30 is bi-directionally coupled to motor 22, and is used for controlling the speed and timing of motor 22, as well as for receiving the back EMF voltage from motor 22. Spindle motor driver 30 receives control signals from commutation logic and speed regulation 34. The operation of motor 22 will be described in more detail later in the discussion of FIG. 3. Commutation logic and speed regulation 34 includes a switching matrix for receiving the back EMF voltage and will be described later in the discussion of FIG. 3.

System controller 38 includes an analog-to-digital converters (ADCs) block 40, a processor 42, and a digital-to-analog converters (DACs) block 44. As shown in FIG. 1, ADCs block 40 also includes analog multiplexers adapted to receive signals representative of the information stored on rotating storage media 28 and input them to analog-to-digital converters. Also DACs block 44 includes pulse width modulators (PWMs) for developing appropriate signals for driving motor 22 at the desired speed. System controller 38 is bi-directionally coupled to commutation logic and speed regulation 34 for receiving the back EMF voltage and for providing control signals for controlling the power driver transistors of spindle motor driver 30. Processor 42 includes a data processor for controlling various functions of hard disk drive system 20 such as the position of voice coil actuator 24 via DACs block 44 and VCM driver 32.

R/W pre-amp 26 is used to preamplify signals provided to and/or received from rotating storage media 28. R/W pre-amp 26 is bi-directionally coupled to R/W channel 36. R/W channel 36 is used to recover bit-stream data from storage media 28 and transmit the bit-stream data to hard disk controller 48. Also, R/W channel 36 converts bit-stream data from hard disk controller 48 to a format recordable on rotating storage media 28. In addition, R/W channel 36 receives servo and timing information for indicating a position of voice coil actuator 24. R/W channel 36 is bi-directionally coupled to system controller 38 via analog multiplexers in ADCs block 40. The head position information is used by system controller 38 to correct for errors between commanded head position and measured head position.

Microsequencer 46 recovers timing information from the data stream recovered from R/W channel 36. In addition, microsequencer 46 provides timing information for controlling the operation of R/W channel 36, system controller 38, and hard disk controller 48.

Hard disk controller 48 is bi-directionally coupled to a host system, such as for example, a desk top personal computer. In response to a request for data by the host, hard disk controller 48 coordinates the operation of hard disk drive 20. Hard disk controller 48 includes a communications port 50 for providing an interface to the host computer system, which transfers data in a format such as the small computer serial interface (SCSI). Hard disk controller 48 is bi-directionally coupled to system controller 38 over which control information is communicated between system controller 38 and hard disk controller 48.

Hard disk drive system 20 also includes a memory unit 54 which is bi-directionally coupled to both system controller 38 and hard disk controller 48. Memory unit 54 includes a flash memory 56, and a program and data memory block 58. Program and data memory block 58 may be implemented by read only memory (ROM) for program storage and random access memory (RAM) for data and temporary program storage. Flash memory 56 is a conventional flash memory formed using floating gate transistors and is erasable on a block-by-block basis.

The various blocks of hard disk drive system 20 may be implemented on several integrated circuits or on a single integrated circuit. In addition, flash memory 56 may be integrated with system controller 38 or hard disk controller 48 on a single monolithic integrated circuit.

Hard disk drive system 20 uses flash memory 56 to store parameters about the operations of the disk drive, such as characteristics of the motor, bad sector information, and the like. It is important for these values to be updated periodically, but to be retained when system power is removed. Hard disk drive system 20 conditions and boosts the back EMF voltage produced from motor 22 to provide a program and/or erase voltage for flash memory 56 without the need for a costly integrated charge pump or separate power supply. In addition to providing a programming or erase voltage for flash memory 56, the boosted back EMF voltage may also be used for driving R/W pre-amp 26 without additional voltage boosting circuitry.

Figure 2:
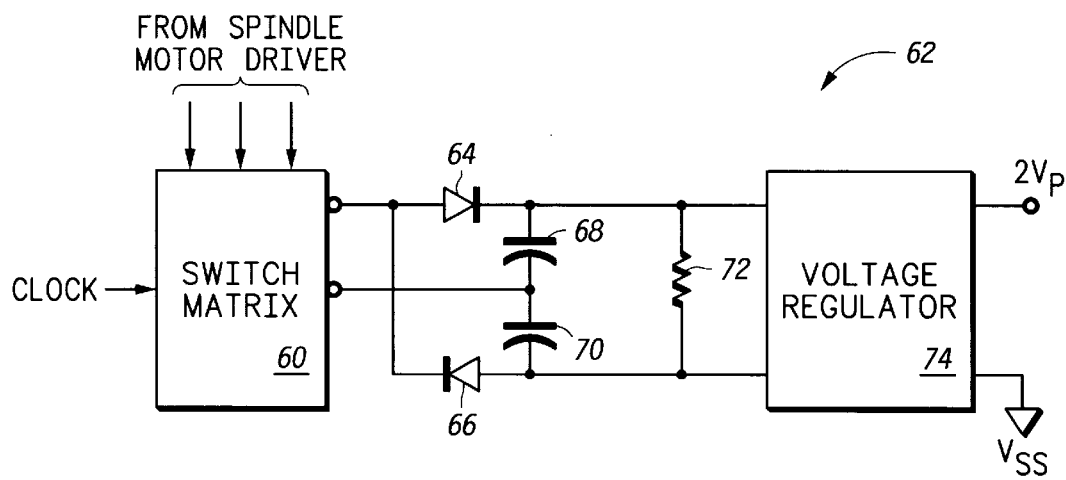
FIG. 2 illustrates, in partial block diagram form and partial schematic diagram form, a portion of the commutation logic and speed regulation of FIG. 1.

FIG. 2 illustrates in partial block diagram form and partial schematic diagram form a portion of commutation logic and speed regulation 34 in accordance with the present invention. A switch matrix 60 receives a variable (AC) voltage produced from the back EMF of motor 22. Switch matrix 60 is used to convert a sequence of back EMF voltage pulses from motor 22 to a relatively continuous AC voltage. The method for generating the back EMF voltage will be discussed later in connection with the discussion of FIG. 3.

Also shown in FIG. 2 is a voltage boosting circuit 62 and a voltage regulator 74. Voltage boosting circuit 62 includes diodes 64 and 66, capacitors 68 and 70, and resistor 72. A positive terminal of diode 64 is connected to a first output terminal of switch matrix 60. Diode 66 has a positive terminal, and a negative terminal connected to the positive terminal of diode 64. Capacitor 68 has a first plate electrode connected to the negative terminal of diode 64, and a second plate electrode connected to a second output terminal of switch matrix 60. Capacitor 70 has a first plate electrode connected to the second plate electrode of capacitor 68, and a second plate electrode connected to the positive terminal of diode 66. Resistor 72 has a first terminal connected to the first plate electrode of capacitor 68, and a second terminal connected to the second plate electrode of capacitor 70.

Voltage boosting circuit 62 performs a voltage doubling function on the AC voltage provided on the first and second output terminals of switch matrix 60. In addition to doubling the voltage, diode 64 and 66 are used to rectify the A/C voltage. Switch matrix 60 has an input terminal for receiving a clock signal labeled "CLOCK" to control the switching of the switch matrix 60.

Voltage regulator 74 has a first input terminal connected to the first terminal of resistor 72 and a second input terminal connected to the second terminal of resistor 72. In response to receiving the boosted and rectified voltage from voltage boosting circuit 62, voltage regulator 74 provides a boosted and regulated output voltage labeled "$2V_P$" where the boosted and regulated output voltage is referenced to a second power supply voltage terminal connected to ground labeled "$V_{SS}$". Voltage regulator 74 regulates output $2V_P$ to be relatively constant over expected input voltage range and current load conditions. Note that in the illustrated embodiment voltage regulator 74 provides a voltage which is approximately double the peak sensed voltage (less losses due to regulation), but in other embodiments may be a different multiple of the peak sensed voltage.

Figure 3:
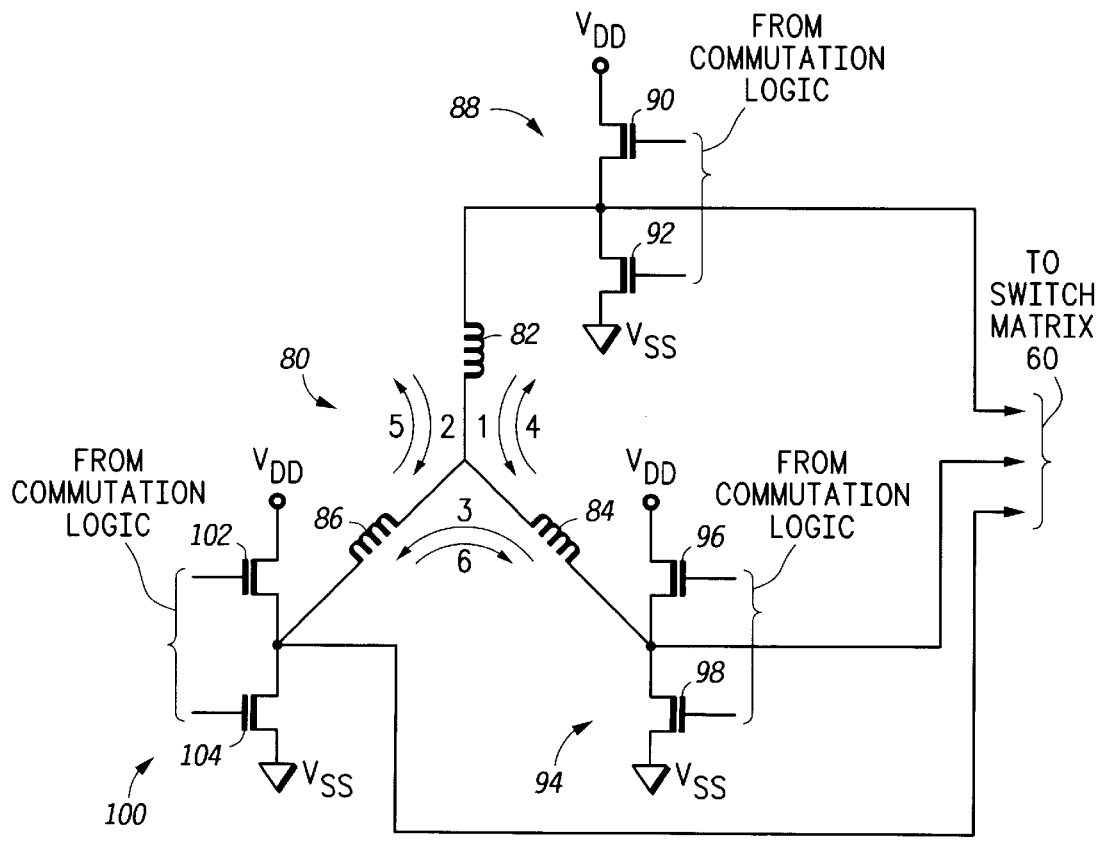
FIG. 3 illustrates, in schematic diagram form, the power drivers of the spindle motor driver and the stator windings of the 3-phase brushless DC motor of FIG. 1.

FIG. 3 illustrates in schematic diagram form the power drivers of spindle motor driver 30 and the stator windings 80 of 3-phase brushless DC motor 22. Stator windings 80 are connected in a Y-connection and include windings 82, 84 and 86. Windings 82, 84, and 86 each have one terminal connected in common as a center tap, and a second terminal connected to a corresponding power driver. A second terminal of winding 82 is connected to power driver 88, a second terminal of winding 84 is connected to power driver 94, and a second terminal of winding 86 is connected to power driver 100. Curved arrows are used to indicate relative current flow in stator windings 80 in a sequence required to cause the motor to rotate. Each of the curved arrows have a number used to indicate the sequence of current flow.

The current flow through stator windings 80 is controlled by the power driver coupled to each leg, or winding, of stator windings 80. Power driver 88 includes N-channel transistors 90 and 92 which are coupled to one side of winding 82 forming one leg of the Y-connected motor 22. Likewise power driver 94 includes N-channel transistors 96 and 98 which are coupled to one side of winding 84 forming a second leg of the Y-connection. Finally power driver 100 includes N-channel transistors 102 and 104 which are which are coupled to one side of winding 86 to form a third leg of the Y-connection. Gates of each of the N-channel transistors are controlled by commutation logic and speed regulation 34 to control current flow through stator windings 80. An output terminal of each of the power drivers 88, 94 and 100 are connected to switch matrix 60 of FIG. 2.

In operation, commutation logic and speed regulation 34 controls the gates of each of the N-channel transistors of the power drivers to cause motor 22 to rotate. In the illustrated embodiment this is done by causing current flow in the direction of the arrows in a sequence indicated by a number associated with each of the arrows. For example, a current is caused to flow through windings 82 and 84 in the direction of the arrow labeled "1" by causing N-channel transistor 90 and N-channel transistor 98 to be conductive while N-channel transistors 92 and 96 are substantially non-conductive. Both of transistors 102 and 104 are substantially non-conductive and winding 86 is undriven for the period of rotation represented by current number 1. Motor 22 also includes a rotor having a set of permanent magnets which cause the rotor to rotate as a result of the applied electromagnetic field generated by windings 82 and 84. Winding 86 is used for generating a "back EMF" voltage pulse by the relative motion of winding 86 to the permanent magnets located in a rotor during the time that windings 82 and 84 are being driven. During a next time period a current labeled "2" is generated through windings 82 and 86. The relative motion of the stator to the rotor causes a back EMF voltage to be generated in winding 84. Likewise, during a third period a current labeled "3" is driven through windings 84 and 86 to generate a back EMF in winding 82 and provided at an output terminal of power driver 88. The rotor continuously rotates through, and repeats, each of the six time periods and these rotations cause two complete revolutions of the rotor.

As the back EMF voltage pulses are generated at each of the unused windings during rotation of the rotor, the back EMF voltage pulses are provided to the input terminals of switch matrix 60 where the voltage pulses are combined to produce a relatively constant voltage, then boosted and regulated. The boosted and regulated voltage may then be used for programming or erasing flash memory 56, or another type of non-volatile memory requiring high voltage for information storage. Also, the boosted and regulated voltage may be used for another purpose, such as for driving R/W pre-amp 26 of FIG. 1.

Note that although the illustrated embodiment shows a stator winding in the Y-connection, one skilled in the art would recognize that other stator winding connections could be used, such as for example, a delta (Δ) connection. Note also that the center tap of stator winding 80 may also be used as a reference for generating the back EMF voltage. Also, the back EMF voltage pulses may be generated using only one of the stator windings, although a voltage ripple will be larger. Also, hard disk drive system 20 may use motor 22 to generate a voltage by first driving motor 22 up to speed, removing the drive voltages, and then converting the stored mechanical energy in the spinning rotor to voltage pulses via generator action. The amount of stored mechanical energy is sufficient in many applications to program or erase a flash memory before the rotor stops rotating. Also, the illustrated embodiment uses N-channel transistors for the power drivers. However, in other embodiments, the power drivers may be bipolar transistors, P-channel transistors, or a combination of N-channel and P-channel transistors.

Using a back EMF voltage that is generated from a motor of hard disk drive system 20 eliminates the need for a charge pump or other type of circuit to generate a boosted voltage in hard drive system 20. By eliminating the use of a charge pump, complexity, cost and size of the integrated circuit are reduced. Note also that the present invention is illustrated in a hard disk drive; however one skilled in the art would recognize that the invention may be implemented in other types of electromechanical systems such as optical drives, magneto-optical drives, printers and scanners.

Although the present invention has been described with reference to a specific embodiment, further modifications and improvements will occur to those skilled in the art. For example, the voltage boosting circuit may use a transformer top boost the sensed voltage instead of a solid state voltage doubler. Therefore it is to be understood that the invention encompasses all such modifications that do not depart from the scope of the invention as defined in the appended claims.

What is claimed is:

1. In an electromechanical system including a motor having a plurality of windings and a driver circuit for driving a voltage alternately on sets of the plurality of windings to ensure a rotation of the motor, a method for generating a voltage comprising the steps of:

(a) driving a first set of the plurality of windings during a first interval using a first voltage derived from a first power supply voltage;

(b) sensing a first back electromotive force (EMF) voltage on a second set of the plurality of windings during said first interval;

(c) driving a third set of the plurality of windings during a second interval using said first voltage;

(d) sensing a second back EMF voltage on a fourth set of the plurality of windings during said second interval;

(e) generating a second voltage different from said first power supply voltage using said first back EMF voltage and said second back EMF voltage; and (f) generating a third voltage having an opposite polarity from said second voltage using said first back EMF voltage and said second back EMF voltage.

2. A circuit for generating an output voltage for use with a motor having a plurality of windings, the motor being driven by a driver circuit which drives first and second sets of the plurality of windings respectively during first and second intervals to ensure a rotation of the motor, comprising:

a switch matrix having a first terminal adapted to be coupled to a first one of the plurality of windings which is undriven during the first interval, a second terminal adapted to be coupled to a second one of the plurality of windings which is undriven during the second interval, and an output terminal, wherein said switch matrix couples said first terminal to said output terminal during the first interval and said second terminal to said output terminal during the second interval;

a voltage boosting circuit having an input terminal coupled to said switch matrix, and an output terminal for providing a step-up voltage; and a voltage regulator having an input terminal coupled to said output terminal of said voltage boosting circuit, and an output terminal for providing the output voltage.

3. The circuit of claim 2 wherein the driver circuit, said switch matrix, said voltage boosting circuit, and said voltage regulator are integrated together on a single monolithic integrated circuit.

4. The circuit of claim 2 wherein said voltage boosting circuit includes a rectifier circuit.

5. The circuit of claim 2 further comprising speed measurement means coupled to respective ones of the plurality of windings, for providing a indication of a location and a speed of an rotor of the motor.

6. The circuit of claim 2 characterized as being implemented as a single monolithic integrated circuit.

7. The circuit of claim 2 wherein the driver circuit receives a power supply voltage and said step-up voltage is characterized as having similar polarity to said power supply voltage.

8. The circuit of claim 2 wherein the driver circuit receives a power supply voltage and said step-up voltage is characterized as having opposite polarity to said power supply voltage.

9. The circuit of claim 2 wherein said voltage boosting circuit further has a second output terminal for providing a second step-up voltage, wherein said second step-up voltage has a polarity opposite to said step-up voltage.

* * * * *